United States Patent
Tsai et al.

(10) Patent No.: US 6,358,589 B1
(45) Date of Patent: Mar. 19, 2002

(54) ORGANIC WRITE-ONCE OPTICAL RECORDING MEDIUM WITH SURFACE PLASMON SUPER-RESOLUTION LAYER

(75) Inventors: Din Ping Tsai, Taichung; Chwei-Jin Yeh, Taipei, both of (TW)

(73) Assignee: Ritek Corporation (TW)

( * ) Notice: Subject to any disclaimer, the term of this patent is extended or adjusted under 35 U.S.C. 154(b) by 0 days.

(21) Appl. No.: 09/514,078

(22) Filed: Feb. 26, 2000

(30) Foreign Application Priority Data

Mar. 1, 1999 (TW) ....................................... 88203116 U

(51) Int. Cl.[7] ................................................. B32B 3/02
(52) U.S. Cl. .................... 428/64.1; 428/64.4; 428/64.8; 430/270.14
(58) Field of Search ................................ 428/64.1, 64.2, 428/64.4, 64.8, 457, 913; 430/270.14, 945.1, 495.1; 369/283, 288

(56) References Cited

U.S. PATENT DOCUMENTS

| | | | | |
|---|---|---|---|---|
| 6,154,437 A | * | 11/2000 | Utsunomiya | 369/275.2 |
| 6,192,024 B1 | * | 2/2001 | Inoue | 269/275.3 |
| 6,242,157 B1 | * | 5/2001 | Tominaga | 43/270.13 |
| 6,285,652 B1 | * | 9/2001 | Tsai | 369/275.1 |

* cited by examiner

*Primary Examiner*—Elizabeth Evans

(57) ABSTRACT

An organic write-once optical recording medium includes a surface plasmon super-resolution layer. The surface plasmon super-resolution layer is a three-layer structure including a first dielectric layer, a second dielectric layer, and a metal layer sandwiched between said first dielectric layer and said second dielectric layer. The metal layer with a certain thickness performs the surface plasmon effect when a laser beam with a suitable wavelength irradiates thereon. By the design and arrangement of the surface plasmon super-resolution layer, the small size of information-carrying pits and the recording marks in the range of around 100 nm is accessible. As a result, the super-resolution without the limit of the optical diffraction is achieved.

5 Claims, 12 Drawing Sheets

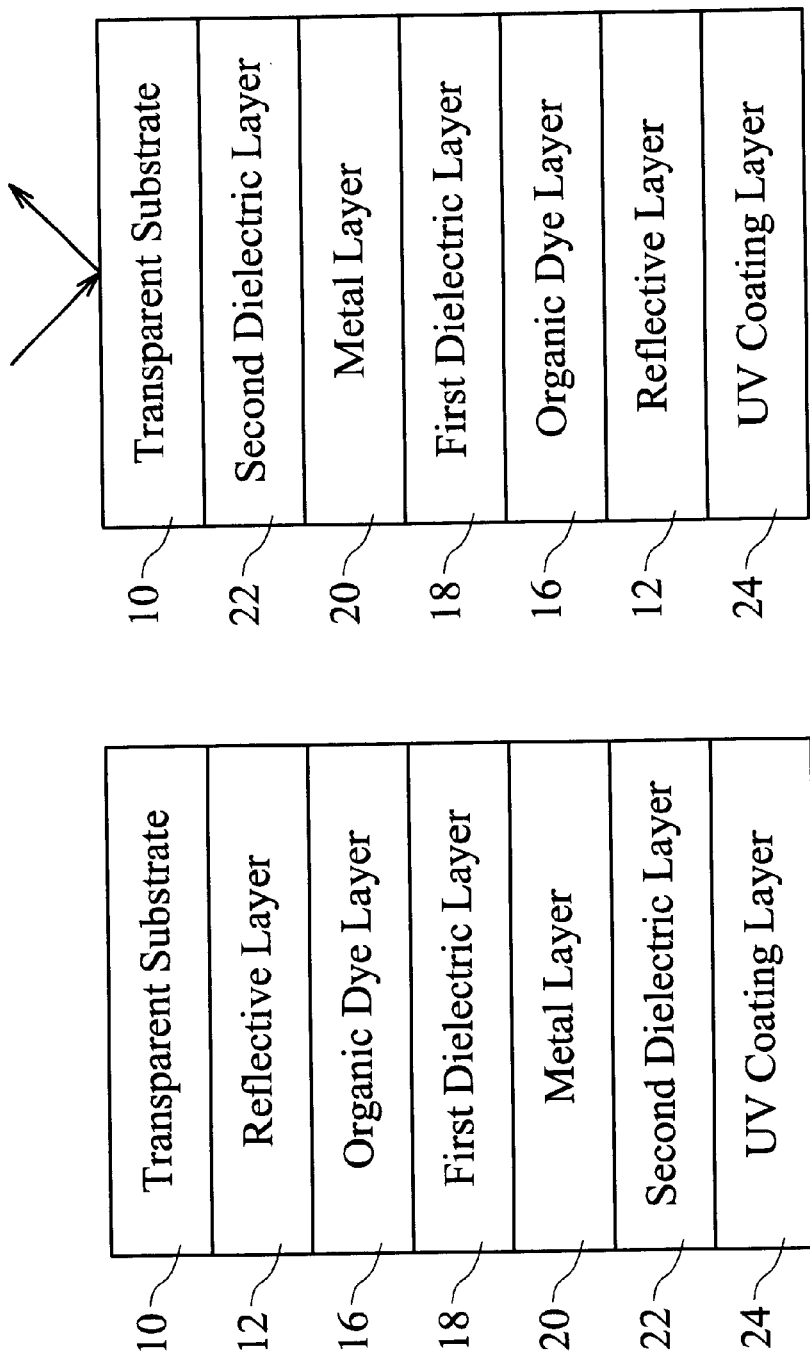

ORGANIC WRITE-ONCE OPTICAL RECORDING MEDIUM WITH SURFACE PLASMON SUPER-RESOLUTION LAYER

FIELD OF THE INVENTION

The present invention relates to an organic write-once optical recording medium, and more particularly, to an organic write-once optical recording medium with surface plasmon super-resolution layer, wherein the surface plasmon super-resolution layer is incorporated to enhance the near-field intensity of a light beam and obtain a smaller reading spot size, thereby achieving a function of the organic write-once optical recording at high density. The surface plasmon super-resolution layer is applicable for the optical recording media with multi-layers for recording information.

BACKGROUND OF THE INVENTION

In 1980, the Philips Company proposed a recording medium having a transparent substrate and a plurality of data pits, and accessed by irradiating a laser beam through the transparent substrate. The recording medium is referred to as a compact disk (CD) and becomes more and more prevailing ever since. Moreover, many types of CD, for example, CD, CD-G; CD-I, photo-CD, VCD, CD-R and CD-RW, have been suggested and realized. In 1995, due to the increasing demand for larger amount of information, a more advanced type of optical disk, digital versatile disk (DVD), is proposed to provide 4.7 GB data on a single sided disk with a diameter of 12 cm.

The density enhancement of DVD can be manifested from the following comparison. The CD family employs a laser beam having a wavelength of 780 nm and a lens with the N.A. (Numeral Aperture)=0.45 to access the data stored therein. The pitch between two adjacent tracks of the CD is about 1.6 $\mu$m. On the other hand, the DVD family employs a laser beam having a wavelength of 650 nm and a lens with the N.A.=0.6 to access the data stored therein. The pitch between two adjacent tracks of the DVD is about 0.74 $\mu$m.

Besides the pre-recording type optical media, multi-rewritable optical disks are also developed for the demand for the storage and modification of the information. Most of them employ phase-charge materials. As the development of various phase-change materials and the success of the direct writing technique, the multi-rewritable and erasable optical recording media are merchandised. For example, PD and CD-RW (650 MB) are produced in 1997, and 2.6 GB DVD RAM by DVD union, 3.0 GB DVD+RW disk by Philips.

As to the mass production of the organic write-once optical disk, the data to be recorded in the optical disk are first processed through scrambling, interleave and then encoded by EDC and ECC coding. Then the encoded data is transferred to a stamper, which has pit region to record the data. By using the stamper, a substrate with data-recording layer can be mass produced by mold ejection. Thereafter, the substrate is coated with a lower dielectric layer, a recording layer, an upper dielectric layer and a reflection layer by sputtering. Finally, a protective layer is applied thereon by spin coating. The user can use a laser beam to form marks on the recording layer by adjusting the power of the laser beam. The recording layer employs materials with reversible phase-change ability such that the optical media can be read and written repeatedly. To form pits with a smaller pitch, the wavelength of the laser beam can be reduced by using the blue light or UV light. Alternatively, the N.A. of the lens system can be further increased so as to increase the data density for the same size of a disk.

Besides, the recording density can be increased by using a more efficient encoding scheme, reducing the size of the pit and track pitch, or using multilayer techniques.

However, there are still several considerable problems present in the above approaches. The efficiency of the encoding scheme is limited by the requirement of the error detection and correction code. The scale down of the pit and track pitch is limited by the resolution of the optical instrument. The employment of a shorter wavelength is influenced by the optical response of the material used, and the stability and cost of a semiconductor laser. The use of a larger N.A. value is inherently limited according to the optics theory and the manufacturing ability. The use of multi-layer techniques is effected by the reading and recording reliability. Finally, the optical diffraction limit plays essential role in the above-mentioned limitation of the size of the pit and track pitch.

Recently, the optical near-field technique becomes more attractive to the researcher involved the development of the optical recording medium. For example, it is reported that the pit pitch of 40 nm~80 nm can be realized by the near-field probe optical recording. The pit pitch can be further reduced to 35 nm by using super-resolution N.A. with a solid immersion lens. However, in the above technique, there is a practical problem for the design of the optical probe due to the requirement of controlling the distance between the probe and the reading surface of the optical medium through the shear force feedback control of the probe. Moreover, the probe system for this near-field technique is not compatible with the present system, and it is possible to damage and break the probe.

Moreover, a super-resolution structure is proposed wherein the near-field effect is realized by the special design of the multi-layer based on the nonlinear optics mechanism other than by the probe.

However, there are some disadvantages present in the above method. As shown in FIG. 1, the accessing to the high density optical recording medium is conducted by the near-field probe. In this method, it is necessary to maintain a constant distance about 100 nm between the probe and the surface of the disk to achieve the effect of the optical near-field. Due to the maintenance of the constant distance, it is necessary to design a control system to control the dynamic shear force generated by the air flow between the probe and the surface of the disk. As a result, the design is more complicated and is not compatible with the present reading and writing system. Moreover, in order to control the distance, the surface of the disk is usually scratched or the probe is broken resulting in the malfunction of the reading and writing system.

For the super-resolution structure, as shown in FIG. 2, an optical nonlinear film having the thickness of 15 nm is incorporated into the disk structure thereby conducting the control of the optical near-field effect. The super-resolution structure is easy to implement because the optical nonlinear film may be formed during the manufacturing process of the disk. Furthermore, similar to the present technology about the optical disk player, it is unnecessary to maintain a minute distance between the optical accessing head and the surface of the disk. As a result, the object of the high density recording is easily achieved by using this technique. However, the super-resolution effect is not generated by the nonlinear optical property of the super-resolution structure and the optical nonlinear film is not made of a dielectric material. Therefore, the physical mechanism of the super-resolution effect should be clearly exploited such that other possible materials and structures to generate super-resolution effect are developed.

SUMMARY OF THE INVENTION

It is therefore an object of the invention to provide an organic write-once optical recording medium wherein a surface plasmon induced layer is incorporated to enhance the field strength of the near-field optical beam and obtain a smaller reading spot size, thereby providing a high-density optical recording effect.

According to the present invention, a high density organic write-once optical recording medium comprising: a transparent substrate; an organic write-once recording layer formed on the transparent substrate; a first dielectric layer formed on the organic write-once recording layer; a metal layer formed on the first dielectric layer; a second dielectric layer formed on the metal layer; and a UV coating layer formed on the second dielectric layer, thereby a surface plasmon is generated in the interface between the second dielectric layer and the metal layer when a laser beam with a wavelength in the range form 300 nm to 800 nm irradiates toward the UV coating layer, and obtains the enhancement effect of the near-field intensity so as to achieve a high resolution for distinguishing minute pits.

BRIEF DESCRIPTION OF DRAWINGS

The above-mentioned and other objects, features, and advantages of the present invention will be more clearly understood from the following detailed description in conjunction with the appended drawings, in which:

FIG. 11 is a cross sectional view showing a first embodiment according to the present invention;

FIG. 12 is a cross sectional view showing a second embodiment according to the present invention;

DETAILED DESCRIPTION OF THE PREFERRED EMBODIMENTS

The surface plasmon is a quantized oscillation of collective electrons in an interface between a metal and a dielectric. It is associated with an electromagnetic field, which is not propagating but is evanescent at the metal surface. The surface plasmon is excited upon the surface of a metal film irradiated by photons at an incident angle that satisfies the dispersion matching condition between the photon and the surface plasmon in the metal.

Figure 1:
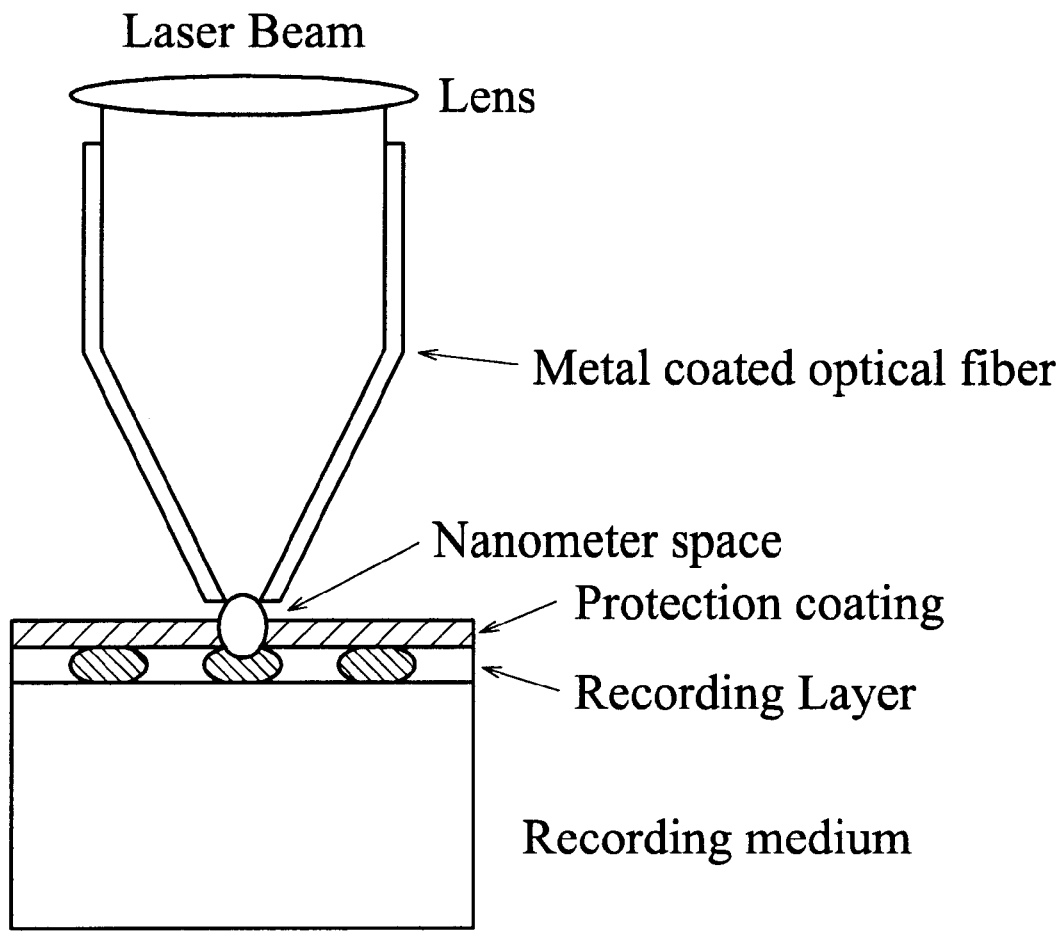
FIG. 1 is a cross sectional view explaining the accessing process to the high-density optical data by a near-field probe.
Figure 2:
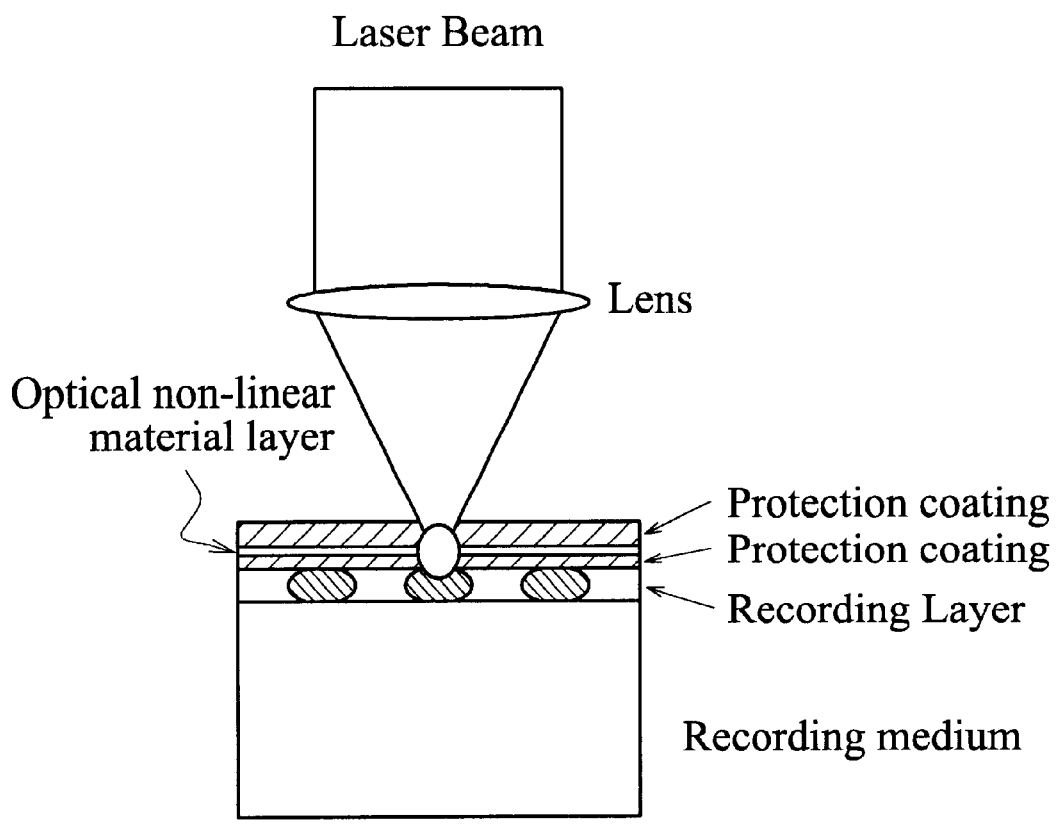
FIG. 2 is a cross sectional view explaining a super-resolution structure using a nonlinear optical film with a thickness of 15 nm.
Figure 3:
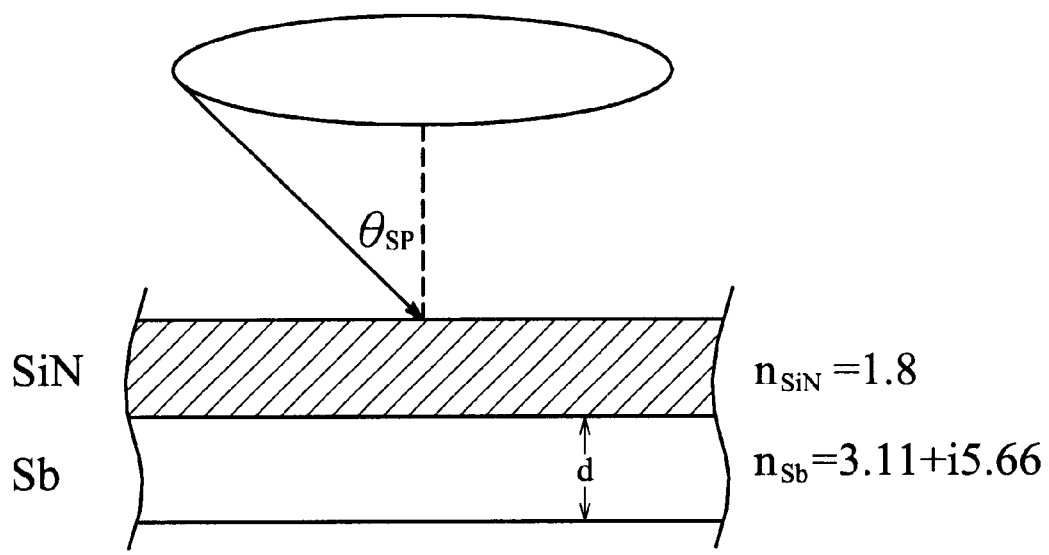
FIG. 3 is a cross sectional view showing the optical configuration for generating the surface plasmon by a Sb thin film.
Figure 4:
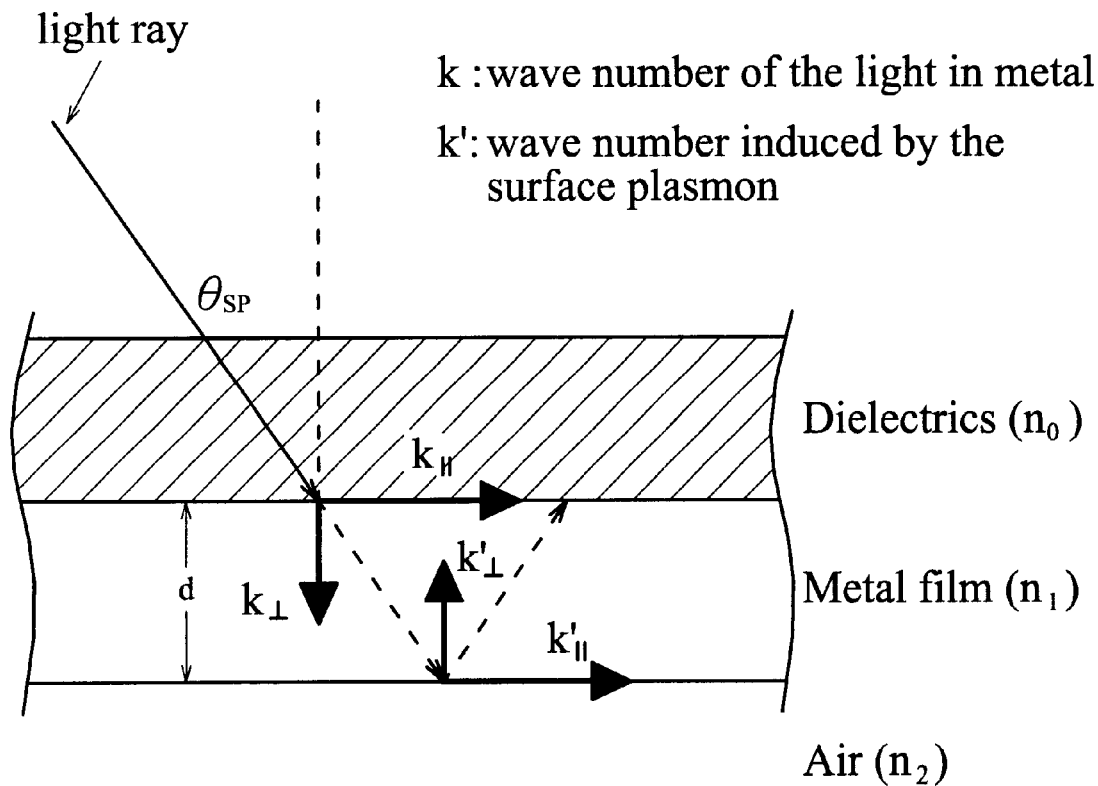
FIG. 4 is a cross sectional view showing a total internal reflection occurred in the Sb thin film shown in FIG. 3.

As shown in FIG. 3, this figure shows the optical configuration for generating surface plasmon on Sb thin film, wherein the laser beam is irradiated on the Sb thin film with a specific incident angle $\theta_{sp}$. As shown in FIG. 4, the refractive index n1 of the metallic layer is larger than the index n2 of the lower dielectric layer (the inner total reflection may occur in this structure). When the incident angle $\theta_{sp}$ of the laser beam is such that the dispersion matching condition can be satisfied, the quantized oscillation of collective electrons in a plasmon surface is occurred.

According to the condition of standing wave: $L=m(\lambda/2)=d/\cos\theta_{sp}$, the quantized oscillation of plasmon is occurred when the thickness of the metal $d=m(\lambda/2)\cos_{sp}$. As to the dispersion matching condition of the surface plasmon, the propagating constant is $$k_{sp} = \frac{\omega}{c}\sqrt{\frac{\epsilon_1(\omega)\epsilon_2(\omega)}{\epsilon_1(\omega)+\epsilon_2(\omega)}},$$

$\epsilon_{(Re)}=n^2-k^2$, and $\epsilon_{(Im)}=2nk$, wherein is the angular frequency, C is the speed of light in vacuum $\epsilon_1(\omega)$, $\epsilon_2(\omega)$ is the dielectric constants in air and metal, respectively. In generally, $k_{sp}(\omega)/k_{light}(\omega)\equiv1.05\sim1.10$ and as to Sb, $\epsilon_{(Re)}=22.36$, $\epsilon_{(Im)}=35.21$, therefore, $k_{sp}(\omega)/k_{light}(\omega)\equiv1.02$. Therefore, the incident laser beam will excite surface plasmon on Sb film by choosing object lens with proper N.A.

Figure 5:
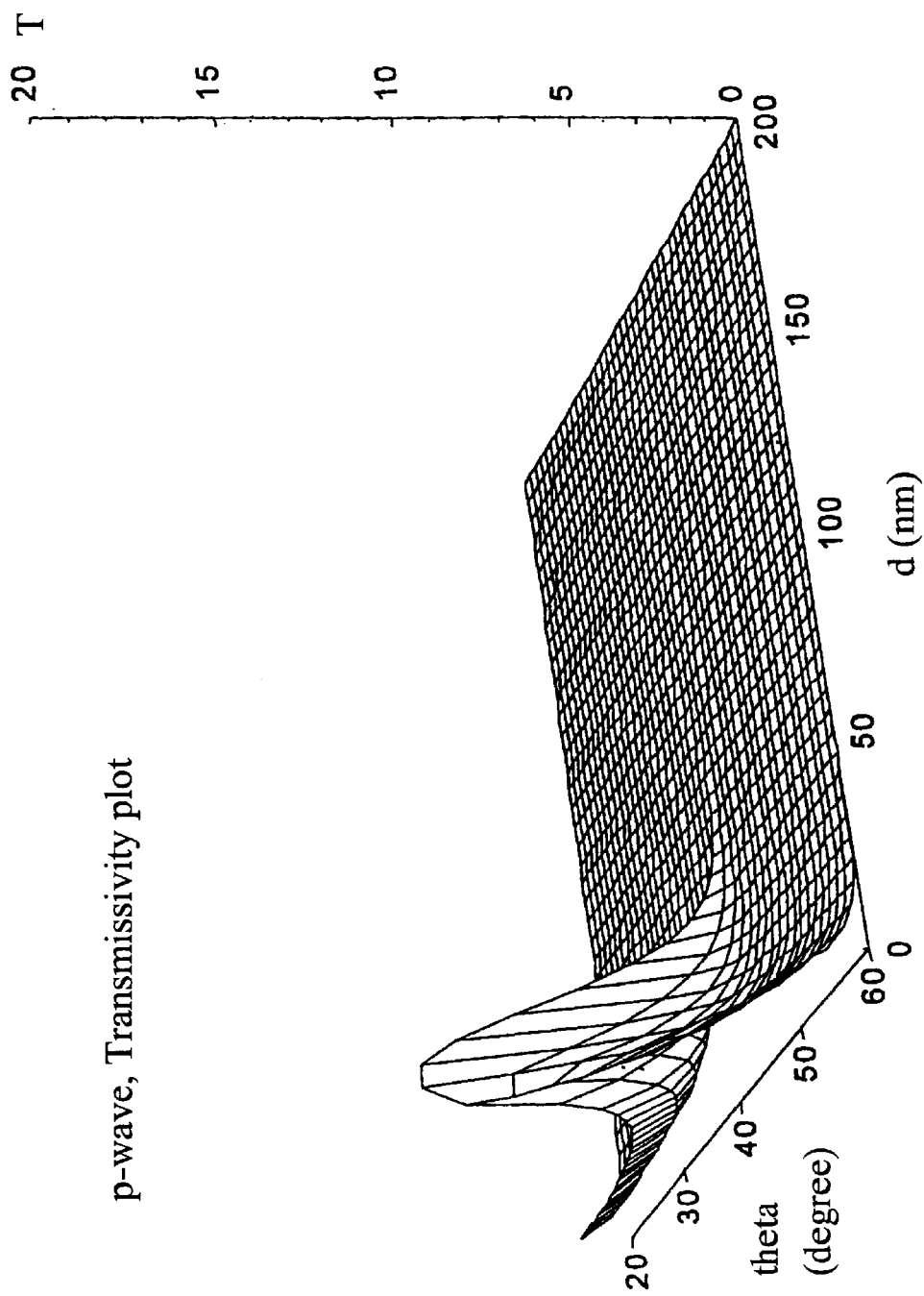
FIG. 5 shows the transmissivity of a P-polarized wave through a Sb film with respect to the thickness of the Sb film and the incident angle of the P-polarized wave.
Figure 6:
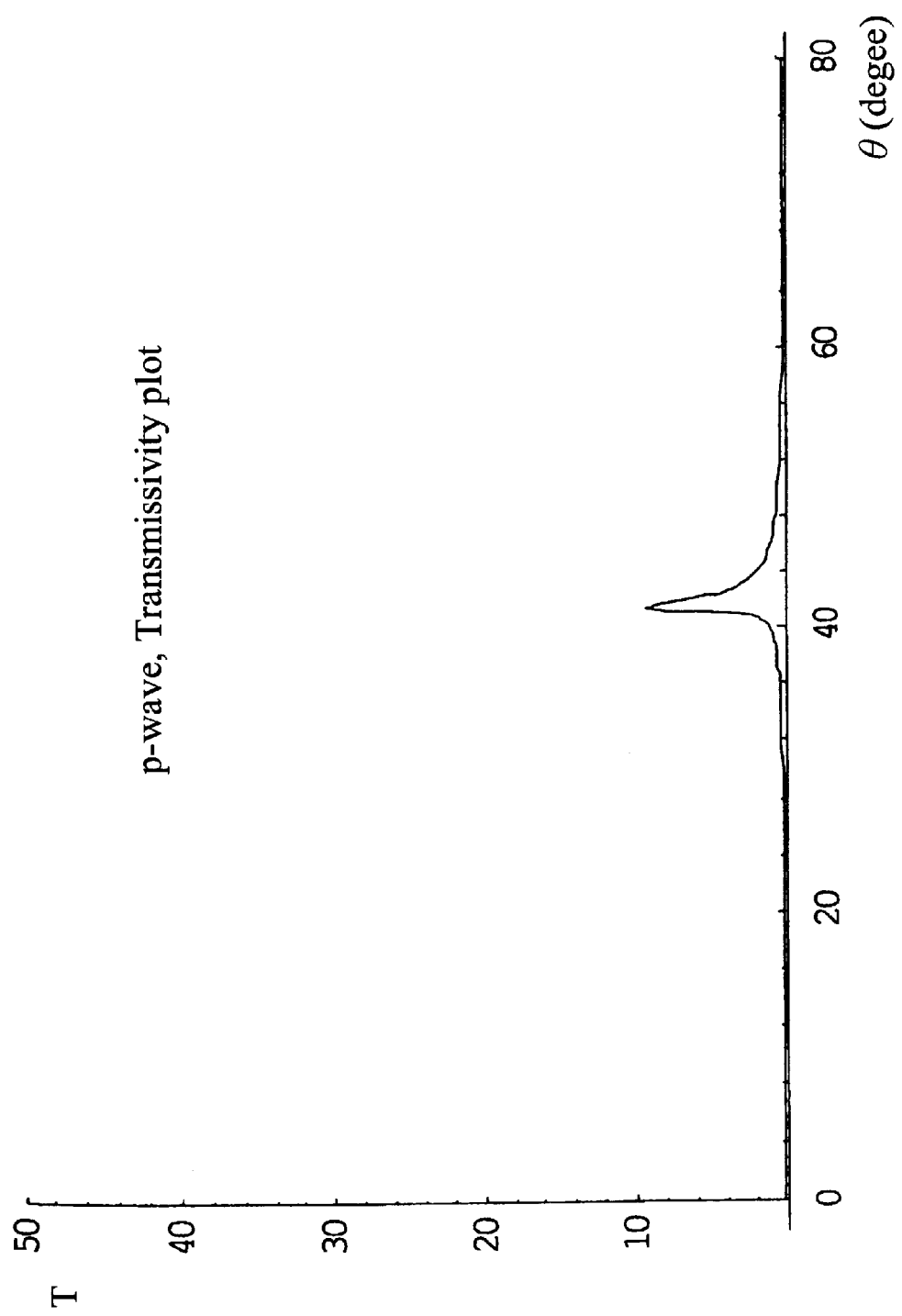
FIG. 6 shows the transmissivity of a P-polarized wave through a Sb film having a thickness of 15 nm.
Figure 7:
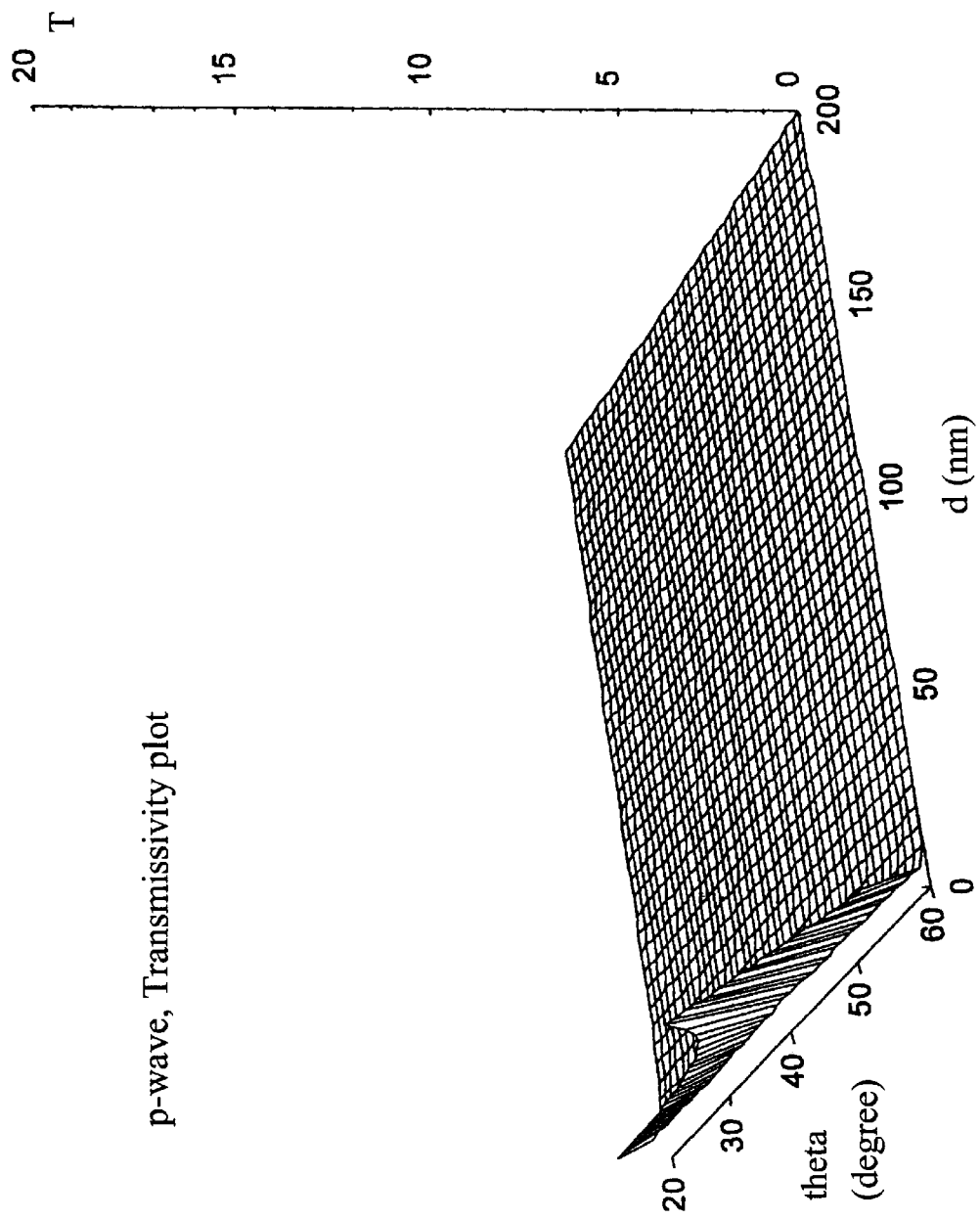
FIG. 7 shows the transmissivity of an S-polarized wave through a Sb film with respect to the thickness of the Sb film and the incident angle of the S-polarized wave.
Figure 8:
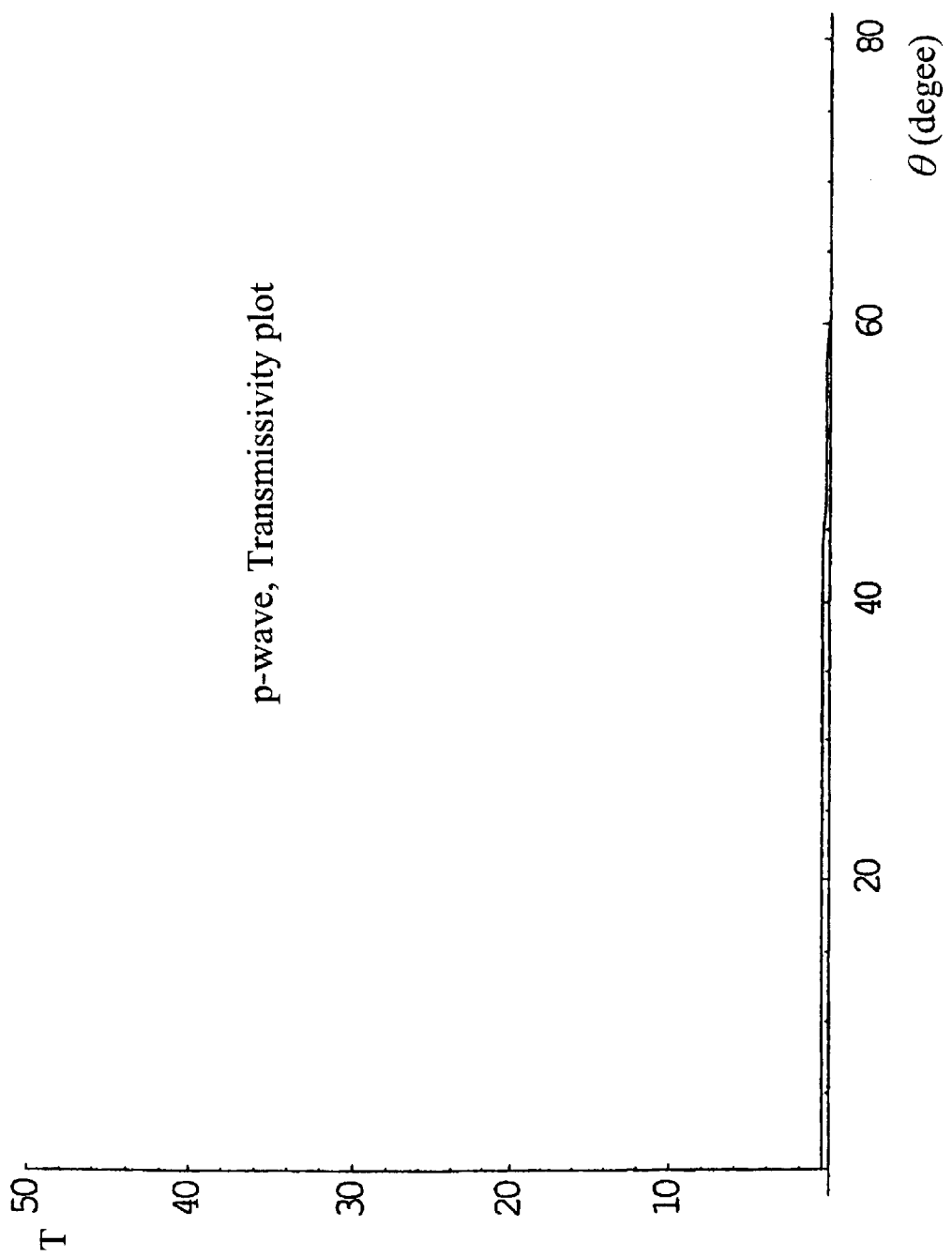
FIG. 8 shows the transmissivity of an S-polarized wave through a Sb film having a thickness of 15 nm.

The incident laser beam can be polarized to an S-wave and a P-wave. FIGS. 5 to 8 show the numeral simulation result for the Sb film irradiated by a laser beam. FIG. 5 shows the transmissivity of a P-polarization wave with respect to the thickness of the Sb film and the incident angle of the P-polarized wave. FIG. 6 shows the transmissivity of a p-polarization wave through a Sb film having a thickness of 15 nm. FIG. 7 shows the transmissivity of an S-polarized wave through a Sb film with respect to the thickness of the Sb film and the incident angle of the S-polarized wave. FIG. 8 shows the transmissivity of a S-polarized wave through a Sb film having a thickness of 15 nm. As can be seen through FIGS. 5 to 8, the transmissivity of the P-polarization wave increases along with the decrease of the thickness of the Sb film while the transmissivity of the S-polarization wave is always rather small and almost constant.

Figure 9:
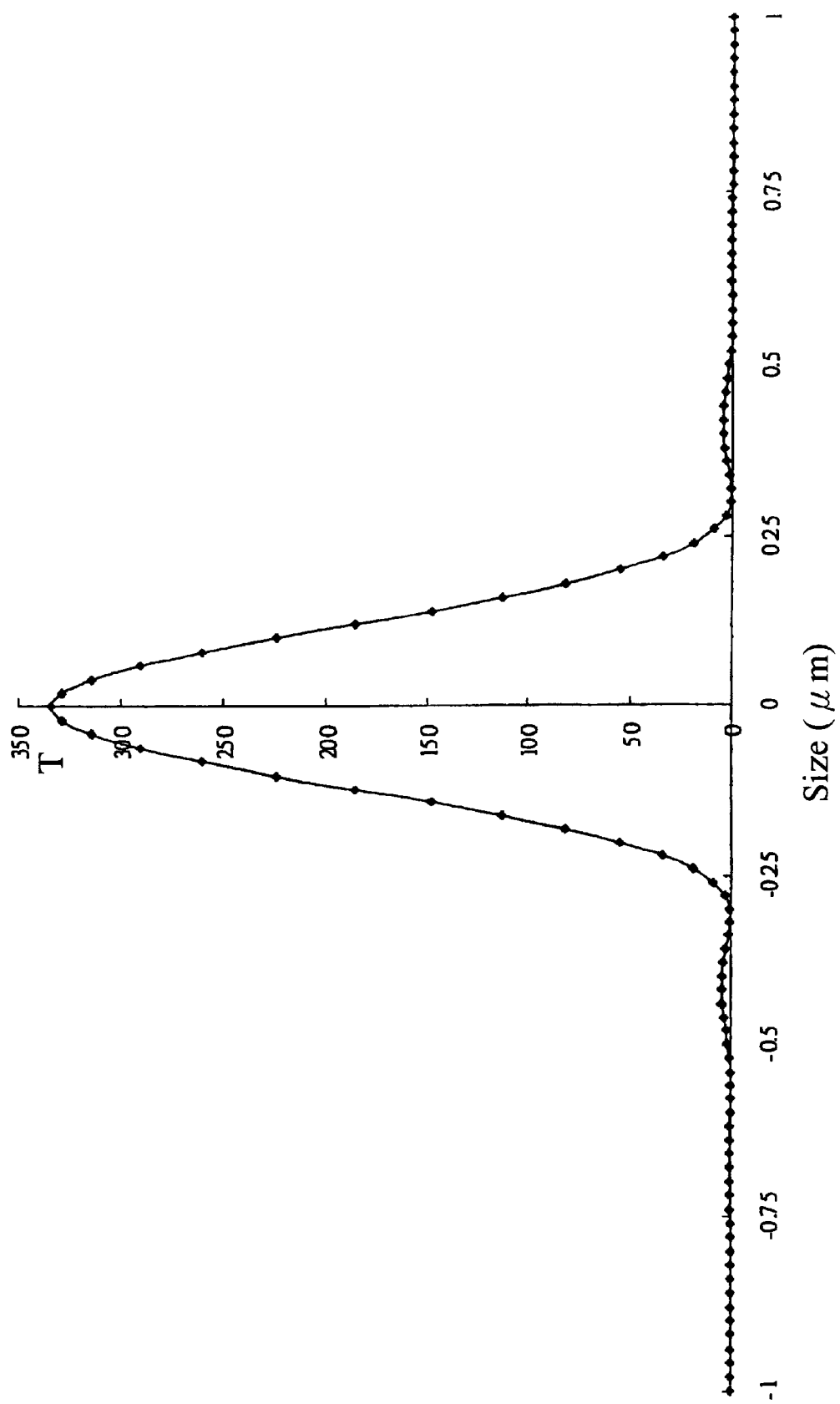
FIG. 9 shows the simulation result of transmissivity of a laser beam with a wavelength of 635 nm through a Sb film having a thickness of 15 nm.
Figure 10:
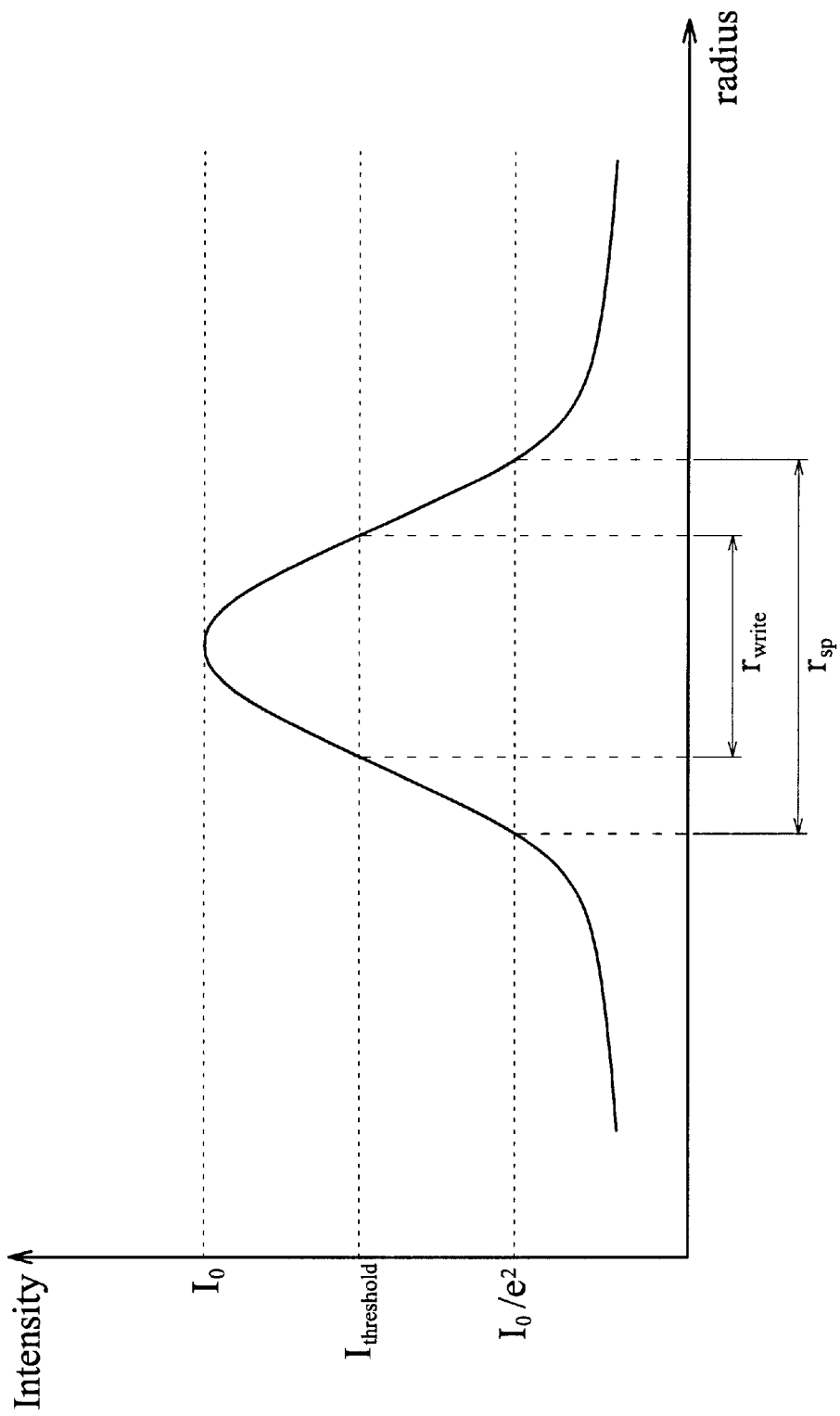
FIG. 10 shows the diameter of a light spot generated by the surface plasmon effect according to the present invention.

As the result of the numerical simulation analysis, FIG. 9 shows the distribution of the transmissivity for a Sb film having a thickness of 15 nm irradiated by a laser beam with $\lambda=635$ nm. The near-field intensity generated by the surface plasmon polariton excitation is enhanced 300 times higher than that generated by a structure without the surface plasmon effect. FIG. 10 shows the intensity profile of the near-field light according to the present invention with a maximum intensity of $I_0$. The size of the optical field with the intensity exceeding $I_0/e2$ is defined as the spot size of the incident laser beam. The incident laser beam causes the recording material subjected to a phase change. However, the size of the phase-change area of the recording material is different from the spot size of the incident laser beam. The size of the phase-change area is determined by a threshold intensity $I_{threshold}$. The recording material is subjected to the phase change only if the intensity of the incident laser beam is larger than the threshold intensity $I_{threshold}$. Moreover, the threshold power may be different with respect to different phase change materials. Therefore, the surface plasmon control layer according to the present invention can be used in the application of a multi-layer disk.

The several preferred embodiments according to the present invention will be described in detail with reference to FIGS. 11 to 14. The present invention is applicable to various organic write-once optical recording media. FIG. 11 shows the first embodiment according to the present invention. The organic write-once optical recording medium according to the first embodiment comprises a transparent PC (polycarbonate) substrate 10, a reflective layer 12 formed on the transparent PC substrate 10, an organic dye layer 16 formed on the reflective layer 12, a first dielectric layer 18 made of SiN and with a thickness of 170 nm formed on the organic dye layer 16, a metal layer 20 made of Sb and with a thickness of 15 nm formed on the first dielectric layer 18, a second dielectric layer 22 made of SiN and with a thickness of 20 nm formed on the metal layer 20, and a UV (ultraviolet) coating layer 24 formed on the second dielectric layer 22. The reading laser light with a wavelength in the range from 300 nm to 800 nm irradiates toward the side of the UV coating layer 24 and is reflected from the same side. The reflected light is received by a photo-detector (not shown) to access the data recorded in the organic dye layer 16.

FIG. 12 shows the second embodiment according to the present invention. The organic write-once optical recording medium according to the second embodiment comprises a transparent PC substrate 10, a second dielectric layer 22 made of SiN and with a thickness of 20 nm formed on the transparent PC substrate 10, a metal layer 20 made of Sb and with a thickness of 15 nm formed on the second dielectric layer 22, a first dielectric layer 18 made of SiN and with a thickness of 170 nm formed on the metal layer 20, an organic dye layer 16 formed on the first dielectric layer 18, a reflective layer 12 formed on the organic dye layer 16, and a UV coating layer 24 formed on the reflective layer 12. The reading laser light with a wavelength in the range from 300 nm to 800 nm irradiates toward the side of the transparent PC substrate 10 and is reflected from the same side. The reflected light is received by a photo-detector (not shown) to access the data recorded in the organic dye layer 16.

Figures 13, 14:
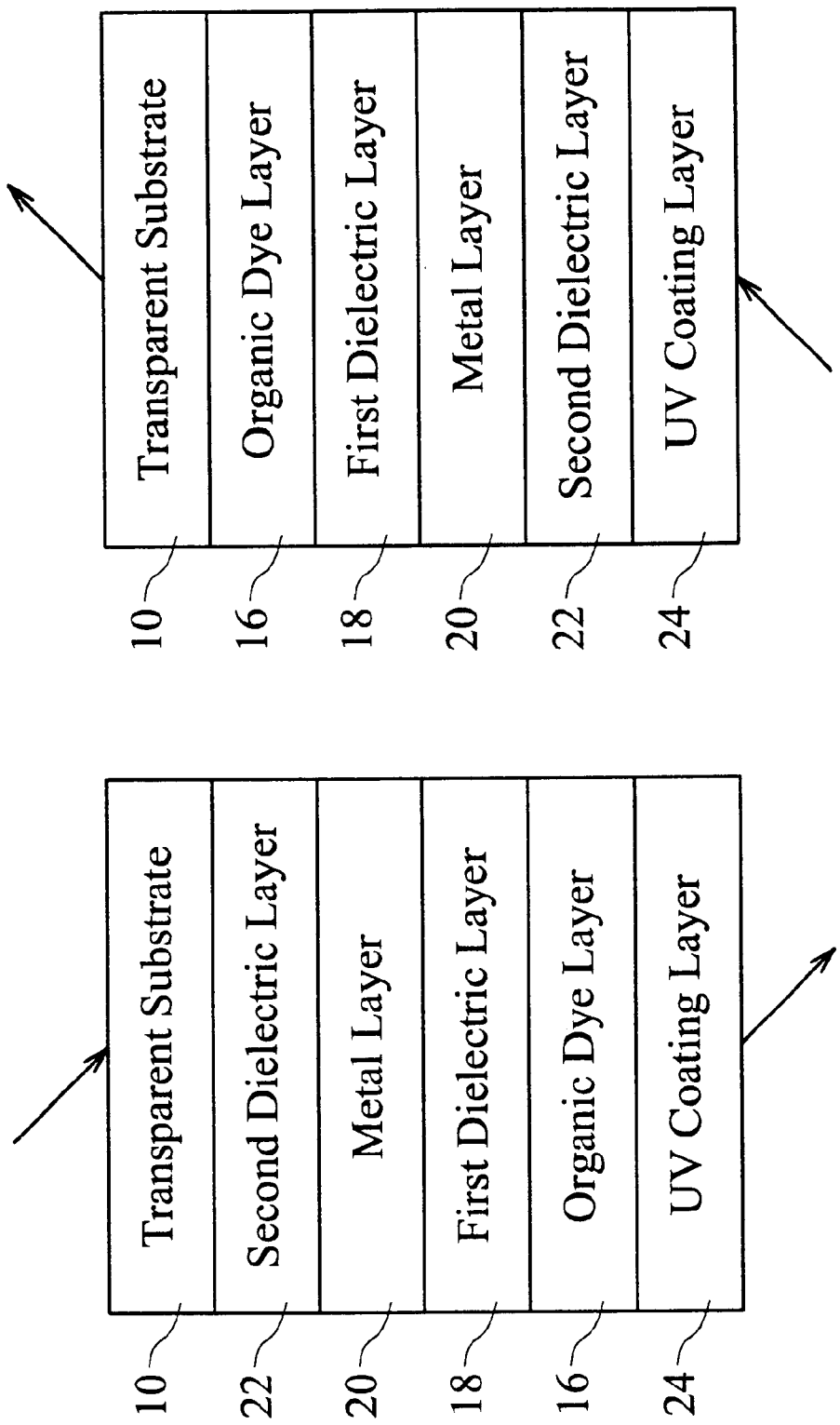
FIG. 13 is a cross sectional view showing a third embodiment according to the present invention.
FIG. 14 is a cross sectional view showing a fourth embodiment according to the present invention.

The embodiments shown in FIGS. 11 and 12 are reflection type disks. On the other hand, the embodiments shown in FIGS. 13 and 14 are transmission type disks. FIG. 13 shows the third embodiment according to the present invention. The organic write-once optical recording medium according to the third embodiment comprises a transparent PC substrate 10, a second dielectric layer 22 made of SiN and with a thickness of 20 nm formed on the transparent PC substrate 10, a metal layer 20 made of Sb and with a thickness of 15 nm formed on the second dielectric layer 22, a first dielectric layer 18 made of SiN and with a thickness of 170 nm formed on the metal layer 20, an organic dye layer 16 formed on the first dielectric layer 18, and a UV coating layer 24 formed on the organic dye layer 16. The optical recording medium according to the third embodiment does not comprise a reflective layer. The reading laser light with a wavelength in the range from 300 nm to 800 nm irradiates toward the side of the PC substrate 10 and is received by a photo-detector (not shown) arranged on the opposite side (i.e. the side of the UV coating layer 24).

FIG. 14 shows the fourth embodiment according to the present invention. The organic write-once optical recording medium according to the fourth embodiment comprises a transparent PC substrate 10, an organic dye layer 16 formed on the transparent PC substrate 10, a first dielectric layer 18 made of SiN and with a thickness of 170 nm formed on the organic dye layer 16, a metal layer 20 made of Sb and with a thickness of 15 nm formed on the first dielectric layer 18, a second dielectric layer 22 made of SiN and with a thickness of 20 nm formed on the metal layer 20, and a UV coating layer 24 formed on the second dielectric layer 22. The optical recording medium according to the fourth embodiment does not comprise a reflective layer. The reading laser light with a wavelength in the range from 300 nm to 800 nm irradiates toward the side of the UV coating layer 24 and is received by a photo-detector (not shown) arranged on the opposite side (i.e. the side of the PC substrate 10).

Accordingly, the present invention has the following advantages.

1. The resolution is not limited by the optical diffraction and no special instrument is required, so the present invention is applicable to accessing by the laser beam with various wavelengths.
2. The near-field intensity of the incident laser beam is enhanced so as to obtain a higher resolution for minute pits.
3. The accessing of the optical recording medium with the surface plasmon super-resolution structure does not involve a special instrument; therefore it is compatible with the existing accessing system.
4. The surface plasmon super-resolution structure is applicable to the accessing of the minute data pit, thereby achieving a higher data density.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

For example, the first and second dielectric layers, the organic recording layer, and the reflective layer can be of multi-layer structures.

What is claimed is:

1. A high density organic write-once optical recording medium comprising:

a transparent substrate;

an organic write-once recording layer formed on said transparent substrate;

a first dielectric layer formed on said organic write-once recording layer;

a metal layer formed on said first dielectric layer;

a second dielectric layer formed on said metal layer; and a UV coating layer formed on said second dielectric layer, thereby a surface plasmon is generated in the interface between said second dielectric layer and said metal layer when a laser beam with a wavelength in the range form 300 nm to 800 nm irradiates toward said UV coating layer, and obtains the enhancement effect of the near-field intensity so as to achieve a high resolution for distinguishing minute pits.

2. A high-density organic write-once optical recording medium according to claim 1, further comprising a reflective layer sandwiched between said transparent substrate and said organic write-once recording layer.

3. A high-density organic write-once optical recording medium according to claim 2, wherein said first dielectric layer is made of SiN having a thickness of 170 nm.

4. A high-density organic write-once optical recording medium according to claim 3, wherein said metal layer is made of Sb having a thickness of 15 nm.

5. A high-density organic write-once optical recording medium according to claim 4, wherein said second dielectric layer is made of SiN having a thickness of 20 nm.

* * * * *